United States Patent

Cullen et al.

[11] Patent Number: 5,787,380
[45] Date of Patent: Jul. 28, 1998

[54] AIR/FUEL CONTROL INCLUDING LEAN CRUISE OPERATION

[75] Inventors: Michael John Cullen, Northville; David George Farmer, Plymouth; Arnold William Brandt, Livonia, all of Mich.

[73] Assignee: Ford Global Technologies, Inc., Dearborn, Mich.

[21] Appl. No.: 549,504

[22] Filed: Oct. 27, 1995

[51] Int. Cl.[6] .................................................. G06G 7/70
[52] U.S. Cl. .................. 701/103; 701/104; 701/102; 123/436; 123/308; 73/117.3; 73/118.2
[58] Field of Search .................. 364/431.01, 431.02, 364/431.03, 431.04, 431.051, 431.052, 426.03, 431.053, 431.08; 123/416, 673, 492, 493, 682, 685, 478, 325, 519, 516, 513, 436, 419, 571, 585, 681, 675, 188.8, 672, 481, 587, 480, 488, 308; 73/118.1, 118.2, 202, 202.5, 204.21, 204.27

[56] References Cited

U.S. PATENT DOCUMENTS

| | | | |
|---|---|---|---|
| 3,995,609 | 12/1976 | Klomp | 123/188.8 |
| 4,373,501 | 2/1983 | Rado | 123/675 |
| 4,434,768 | 3/1984 | Ninomiya | 123/436 |
| 4,558,678 | 12/1985 | Nishimura et al. | 123/494 |
| 4,616,621 | 10/1986 | Kuroiwa et al. | 123/585 |
| 4,624,134 | 11/1986 | Nagano | 73/118.2 |
| 4,653,452 | 3/1987 | Sawada et al. | 123/491 |
| 4,660,533 | 4/1987 | Watabe et al. | 123/681 |
| 4,665,883 | 5/1987 | Amano et al. | 123/571 |
| 4,677,959 | 7/1987 | Suzuki et al. | 123/681 |
| 4,723,443 | 2/1988 | Usui et al. | 73/118.2 |
| 4,750,352 | 6/1988 | Kolhoff | 701/102 |
| 4,817,576 | 4/1989 | Abe et al. | 123/519 |
| 4,860,211 | 8/1989 | Hatanaka et al. | 364/431.055 |
| 4,958,609 | 9/1990 | Trombley et al. | 123/578 |
| 5,029,569 | 7/1991 | Cullen et al. | 364/510 |
| 5,136,517 | 8/1992 | Cullen et al. | 364/431.051 |
| 5,224,044 | 6/1993 | Tamura et al. | 364/431.053 |
| 5,325,828 | 7/1994 | Yamaguchi et al. | 123/571 |
| 5,331,936 | 7/1994 | Messih et al. | 123/480 |
| 5,384,707 | 1/1995 | Kerns et al. | 364/431.11 |
| 5,413,078 | 5/1995 | Mitsunaga et al. | 123/492 |
| 5,483,939 | 1/1996 | Kamura et al. | 123/492 |
| 5,588,410 | 12/1996 | Tamura et al. | 123/416 |
| 5,690,071 | 11/1997 | Janokovic | 123/436 |

*Primary Examiner*—Jacques H. Louis-Jacques
*Attorney, Agent, or Firm*—Allan J. Lippa

[57] ABSTRACT

A control method is described for an engine having a throttle body coupled to the engine intake manifold and a bypass air passageway coupled to the throttle body via an electronically controllable bypass valve. A single measurement of air inducted through both the throttle body and the bypass air passageway is provided by an air flow meter. Fuel is delivered to the intake manifold in relation to the single air measurement. An air flow correction value is generated from a functional relationship between engine torque and air/fuel ratio during lean air/fuel operating conditions. Air flow through the bypass passageway is increased by the air flow correction value to compensate for engine torque loss resulting from such lean operation.

5 Claims, 4 Drawing Sheets

AIR/FUEL CONTROL INCLUDING LEAN CRUISE OPERATION

BACKGROUND OF THE INVENTION

The field of the invention relates to control systems for controlling engine air/fuel operation during lean cruise modes.

U.S. Pat. No. 4,612,621 discloses an engine air/fuel control system having a lean cruise mode. An air flowmeter connected to a throttle body provides a measurement of air inducted through the throttle body past a throttle plate. An air bypass passageway also provides air for induction into the engine without measurement by the air flow meter or regulation by the throttle plate. Fuel is delivered to the engine in relation to the air measured by the air flow meter to approach stoichiometric combustion. For lean engine operation, additional air is inducted through the air bypass passageway. Because the air inducted through the bypass passageway is not metered, no additional fuel is provided and lean air/fuel operation results. To alleviate loss in engine torque caused by such inducted bypass air, fuel compensation is estimated from a table and fuel added independent of air flow measurement.

The inventors herein have recognized numerous problems with the above approach. For example, the additional fuel to compensate for engine torque loss during lean cruise operation is provided based upon air volume rather than air mass. Accordingly, inaccurate fuel delivery may be provided and operation at a desired lean air/fuel ratio not achieved.

SUMMARY OF THE INVENTION

An object of the invention herein is to transition engine air/fuel operation between stoichiometry and a desired lean air/fuel ratio with minimal disturbance to engine torque output while maintaining accurate air/fuel control.

The above object is achieved and problems with prior approaches overcome by providing an apparatus and air/fuel control method for an engine having a throttle body coupled to the engine intake manifold by a bypass air passageway coupled to the throttle body via an electronically controllable bypass field. In one particular aspect of the invention, the method comprises the steps of: providing a single measurement of air inducted through both the throttle body and the bypass air passageway into the intake manifold from an airflow meter coupled to the throttle body downstream of the bypass air passageway; delivering fuel to the intake manifold in relation to the inducted air measurement to achieve a desired air/fuel ratio; altering the delivered fuel to maintain a predetermined engine air/fuel ratio lean of the desired air/fuel ratio during a lean engine operating mode; generating an airflow correction amount from a functional relationship between engine torque and air/fuel ratio; and increasing airflow through the bypass air passageway by the airflow correction amount during the lean operating mode to compensate for engine torque loss resulting from operation at the predetermined air/fuel ratio.

An advantage of the above aspect of the invention is that accurate engine air/fuel control is maintained while transitioning between a desired lean air/fuel ratio and a richer air/fuel ratio with minimal fluctuation in engine torque output.

BRIEF DESCRIPTION OF THE DRAWINGS

The above object is achieved, problems of prior approaches overcome, and advantages obtained, by an embodiment in which the invention is used to advantage which is now described with reference to the attached drawings wherein.

DESCRIPTION OF AN EMBODIMENT

Figure 1:
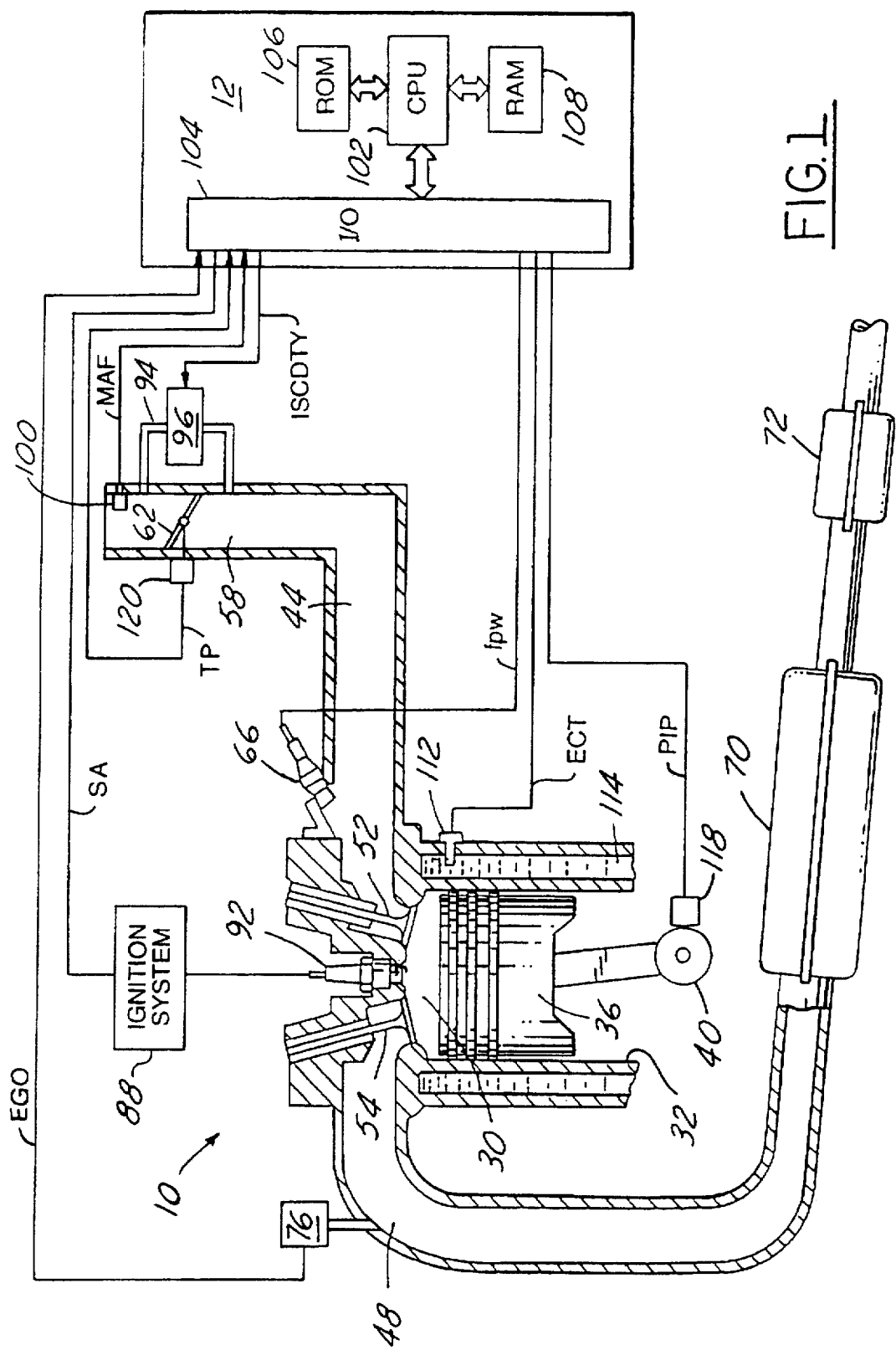
FIG. 1 is a block diagram of an embodiment in which the invention is used to advantage.

Internal combustion engine 10 comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Intake manifold 44 is shown communicating with throttle body 58 via throttle plate 62. Intake manifold 44 is also shown having fuel injector 66 coupled thereto for delivering liquid fuel in proportion to the pulse width of signal fpw from controller 12. Fuel is delivered to fuel injector 66 by a conventional fuel system (not shown) including a fuel tank, fuel pump, and fuel rail (not shown).

Catalytic converter 70 is shown coupled to exhaust manifold 48 upstream of nitrogen oxide trap 72. Exhaust gas oxygen sensor 76 is shown coupled to exhaust manifold 48 upstream of catalytic converter 70. In this particular example, sensor 76 provides signal EGO to controller 12 which converts signal EGO into two-state signal EGOS. A high voltage state of signal EGOS indicates exhaust gases are rich of a desired air/fuel ratio and a low voltage state of signal EGOS indicates exhaust gases are lean of the desired air/fuel ratio. Typically, the desired air/fuel ratio is selected at stoichiometry which falls within the peak efficiency window of catalytic converter 70.

Idle bypass passageway 94 is shown coupled to throttle body 58 in parallel with throttle plate 66 to provide air to intake manifold 44 via solenoid valve 96 independently of the position of throttle plate 62. Controller 12 provides pulse width modulated signal ISDC to solenoid valve 96 so that airflow is inducted into intake manifold 44 at a rate proportional to the duty cycle of signal ISDC. Conventional distributorless ignition system 88 provides ignition spark to combustion chamber 30 via spark plug 92 in response to spark advance signal SA from controller 12.

Controller 12 is shown in FIG. 1 as a conventional microcomputer including: microprocessor unit 102, input/output ports 104, an electronic storage medium for executable programs and calibration values shown as read only memory chip 106 in this particular example, random access memory 108, and a conventional data bus. Controller 12 is shown receiving various signals from sensors coupled to engine 10, in addition to those signals previously discussed, including: measurements of inducted mass air flow (MAF) from mass air flow sensor 110 which is coupled to throttle body 58 upstream of air bypass passageway 94 to provide a total measurement of airflow inducted into intake manifold 44 via both throttle body 58 and air bypass passageway 94; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120.

Figure 2:
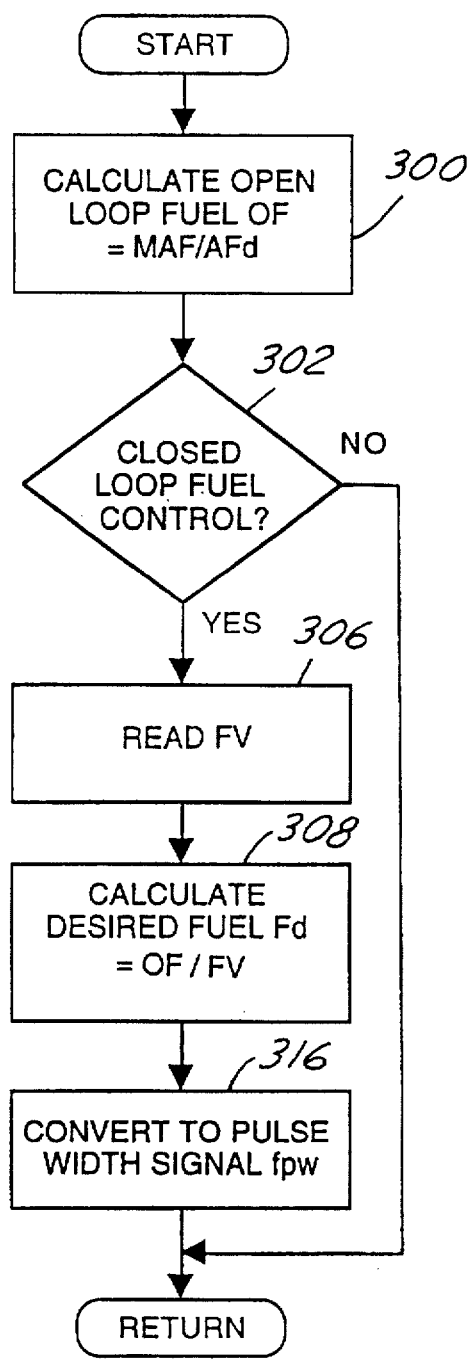
FIGS. 2-4 are high level flow charts illustrating various steps performed by a portion of the embodiment shown in FIG. 1.
Figure 5:
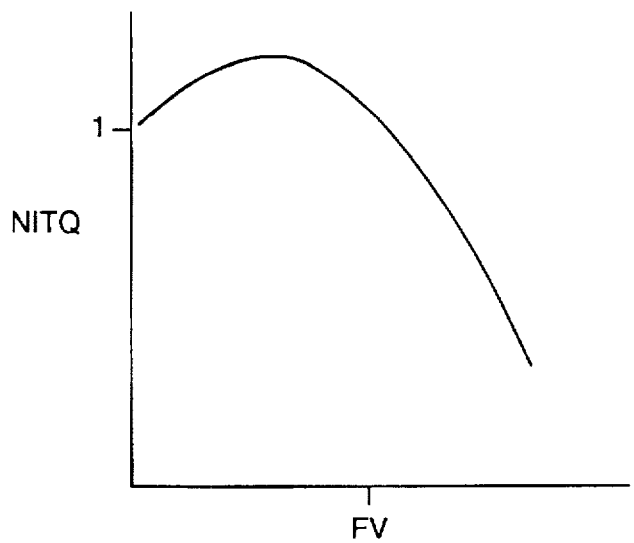
FIG. 5 is a graphical representation of various engine parameters which are used to advantage by the embodiment shown in FIG. 1.

The liquid fuel delivery routine executed by controller 12 for controlling engine 10 is now described beginning with reference to the flowchart shown in FIG. 2. An open loop calculation of desired liquid fuel (signal OF) is calculated in step 300. More specifically, the measurement of inducted mass airflow (MAF) from sensor 110 is divided by a desired air/fuel ratio (AFd) which, in this example, is correlated with stoichiometric combustion. A determination is made that closed loop or feedback control is desired (step 302), by monitoring engine operating parameters such as temperature ECT. Fuel command or desired fuel signal Fd is generated by dividing feedback variable FV into the previously generated open loop calculation of desired fuel (signal OF) as shown in step 308. Desired fuel signal Fd is then converted to pulse width signal fpw (step 316) for actuating fuel injector 66 thereby delivering fuel to engine 10 in relation to the magnitude of desired fuel signal Fd.

Figure 3:
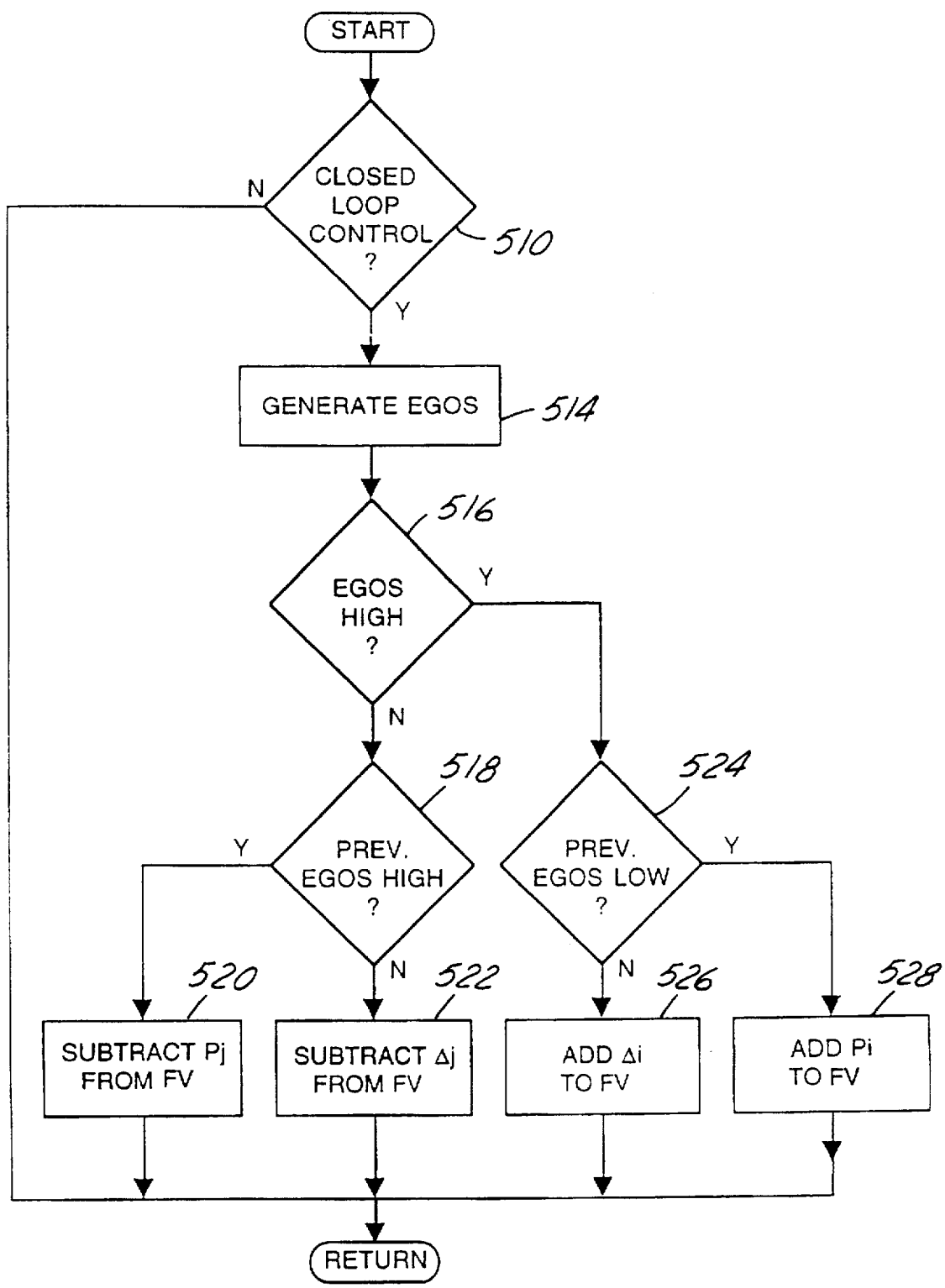

The air/fuel feedback routine executed by controller 12 to generate fuel feedback variable FV is now described with reference to the flowchart shown in FIG. 3. Two-state signal EGOS is generated from signal EGO (514) in the manner previously described herein with reference to FIG. 1. Preselected proportional term Pj is subtracted from feedback variable FV (step 520) when signal EGOS is low (step 516), but was high during the previous background loop of controller 12 (step 518). When signal EGOS is low (step 516), and was also low during the previous background loop (step 518), preselected integral term Aj, is subtracted from feedback variable FV (step 522).

Similarly, when signal EGOS is high (step 516), and was also high during the previous background loop of controller 12 (step 524), integral term Ai, is added to feedback variable FV (step 526). When signal EGOS is high (step 516), but was low during the previous background loop (step 524), proportional term Pi is added to feedback variable FV (step 528).

In accordance with the above described operation, feedback variable FV is generated from a proportional plus integral controller (PI) responsive to exhaust gas oxygen sensor 76. The integration steps for integrating signal EGOS in a direction to cause a lean air/fuel correction are provided by integration steps Di, and the proportional term for such correction provided by Pj. Similarly integral term Dj and proportional term Pj cause rich air/fuel correction.

Figure 4:
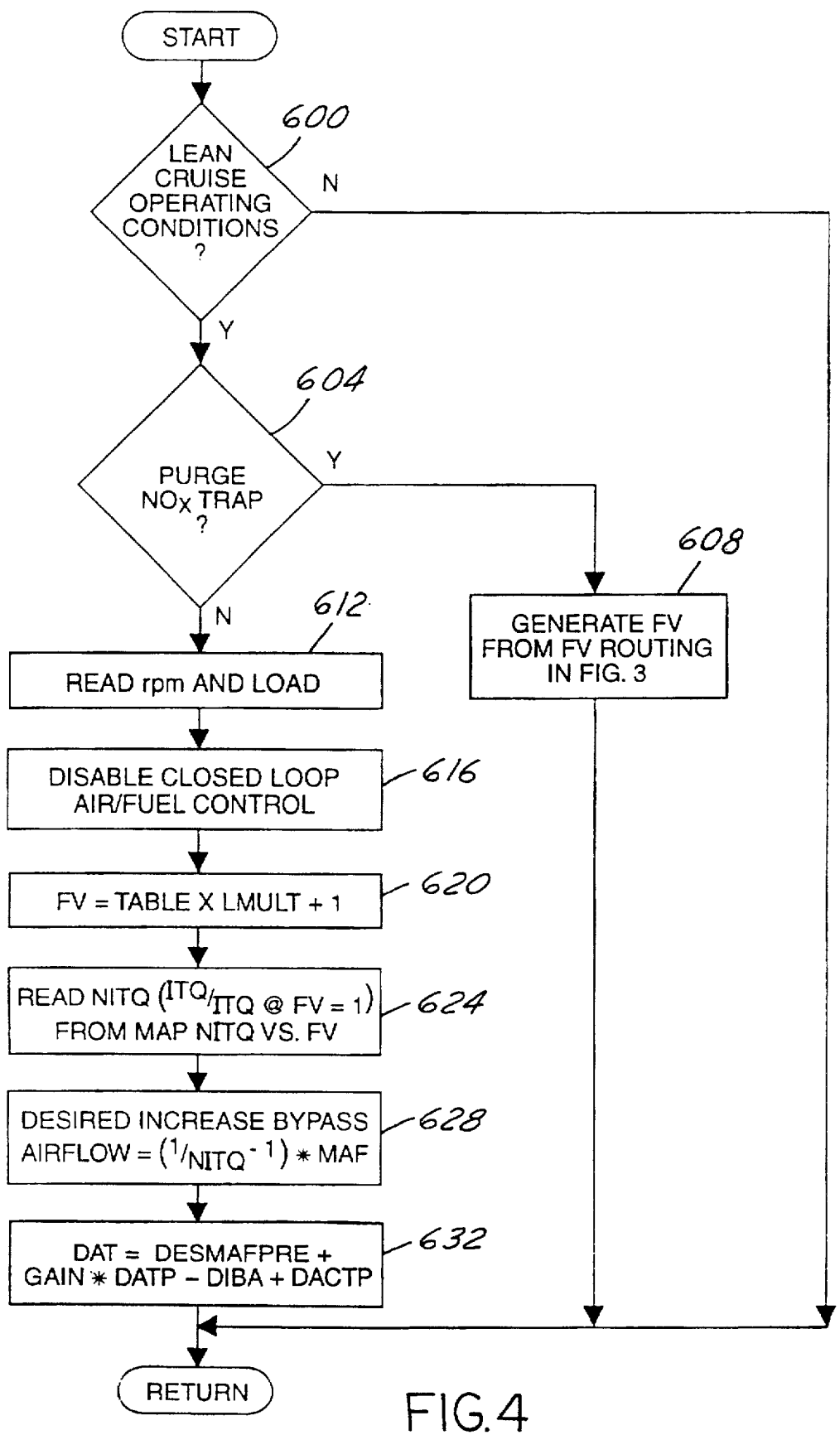

Referring now to FIG. 4, operation of engine 10 is now described during the lean cruise mode. In general, during the lean cruise mode, air fuel operation proceeds open loop at a predetermined value such as 19 lb air/lb fuel for enhanced fuel economy. Nitrogen oxide trap 72 will store any nitrogen oxides passing through catalytic converter 70. Periodically, nitrogen oxide trap 72 is purged of stored nitrogen oxides by operating engine 10 at either a stoichiometric air/fuel ratio or an air/fuel ratio rich of stoichiometry.

Lean cruise operating conditions are first detected in steps 600 including vehicle speed being above a predetermined value or throttle position TP being above a predetermined value. Lean cruise operation will then commence unless an indication is provided that nitrogen oxide trap 72 is near its capacity and should be purged (604). Should that be the case, feedback variable FV is generated (608) as provided in the routine previously described with particular reference to FIG. 3. On the other hand, if purge conditions are not present (604), the routine provided in this FIG. 4 continues for lean cruise conditions.

Engine rpm and load are read in steps 612, closed loop air/fuel control is disabled (616), and feedback variable FV is generated in an open loop manner to provide lean air/fuel engine operation. More specifically, referring to step 620 in this particular example, feedback variable FV is generated by reading a table value as a function of speed and load and multiplying the table value by multiplier LMULT. The resulting product is then added to unity which is the stoichiometric air/fuel reference. Multiplier LMULT, which varies between 0 and unity, is gradually incremented to ramp engine air/fuel operation to a desired lean air/fuel ratio. Feedback variable FV is thereby generated which is an indication of desired air/fuel air ratio.

Normalized indicated torque NITQ is then read from a map of normalized indicated torque NITQ versus feedback variable FV (624). An example of such a map is shown graphically where normalized indicated torque NITQ is generated by dividing indicated torque at a stoichiometric air/fuel ratio (i.e., FV=1) into actual indicated torque. Actual Indicated torque is generated, in this particular example, from an engine speed and load table.

In general, an estimate of the decline in engine torque caused by lean air/fuel operation during the lean cruise mode is provided by the map of normalized indicated torque NITQ versus feedback variable FV. The drop in torque is compensated for by proportionately increasing inducted air flow through air bypass passageway 94. More specifically, referring to step 628, the percentage drop in normalized indicated torque is provided by the difference between the reciprocal of normalized indicated torque MITQ and unity. This difference is multiplied by the measurement of total inducted air flow (MAF) into intake manifold 44 through both throttle body 58 and air bypass passageway 54 to generate the desired increase in bypass air flow (DIBA).

Referring now to steps 632, total desired air flow (DAT) through bypass passageway 94 is generated by summing: desired mass air flow needed for engine idle DESMAFPRE to a product of a gain value times desired air flow for throttle position TP (GAIN * DATP); the negative of air leakage around a closed throttle plate (DACP); and the previously generated desired increase in bypass air flow to compensate for lean cruise operation (DIBA). A drop in engine torque which would otherwise occur when transitioning to lean air/fuel operation is thereby avoided and engine air/fuel control is concurrently achieved.

Although one example of an embodiment which practices the invention has been described herein, there are numerous other examples which could also be described. For example, the invention may be used to advantage with other forms of providing engine torque measurements from indications of engine air/fuel ratio such as algorithmic calculations. Further, the invention may be used to advantage with proportional exhaust gas oxygen sensors. And other combinations of analog devices and discrete ICs may be used to advantage in place of a microprocessor. The invention is therefore to be defined only in accordance with the following claims.

We claim:

1. A system for changing engine air/fuel ratio from a stoichiometric value to a lean value without reduction in engine torque output, comprising:

a throttle body coupled to the engine having a throttle plate positioned therein;

an air bypass passageway coupled to said throttle body having an inlet connected upstream of said throttle and an outlet coupled to the engine downstream of said throttle;

a control valve connected to said bypass passageway for controlling airflow through said bypass passageway in proportion to a control signal;

a mass airflow meter connected to said throttle body upstream of said throttle for producing a measurement of total mass airflow inducted through both said throttle body and said bypass passageway into said engine;

first control means providing fuel to the engine in proportion to a ratio of said total mass airflow to a desired air/fuel ratio;

second control means switching engine air/fuel operation to a lean air/fuel value by changing said desired air/fuel ratio to a desired lean air/fuel ratio which forces said first control means to provide fuel in proportion to said desired lean air/fuel ratio so that engine air/fuel mixture inducted into the engine is at said desired lean air/fuel ratio; and third control means for causing an increase in volume of said inducted air/fuel mixture to compensate for loss in engine torque resulting from switching to said lean air/fuel ratio while maintaining said desired lean air/fuel ratio, said third control means increasing airflow through said bypass passageway via said control signal whereby said total airflow measurement increases and said first control means proportionally increases delivered fuel in response to said airflow measurement to achieve said increased air/fuel volume while maintaining said desired lean air/fuel ratio and avoiding a drop in the engine torque output.

2. The system recited in claim 1 wherein said amount of bypass airflow increase is generated by determining a desired engine torque increase from said functional relationship between engine torque and said predetermined air/fuel ratio.

3. The system recited in claim 2 wherein said functional relationship comprises a map of normalized engine torque versus normalized air/fuel ratio.

4. The system recited in claim 3 wherein said normalized engine torque comprises a ratio of indicated engine torque to engine torque at said desired air/fuel ratio.

5. The system recited in claim 1 further comprising an exhaust gas oxygen sensor coupled to the engine and wherein said air/fuel controller generates a feedback variable by integrating an output of said exhaust gas oxygen sensor for adjusting said delivered fuel to maintain said desired air/fuel ratio.

* * * * *